(12) United States Patent
Kalmuk et al.

(10) Patent No.: US 7,373,647 B2
(45) Date of Patent: May 13, 2008

(54) METHOD AND SYSTEM FOR OPTIMIZING FILE TABLE USAGE

(75) Inventors: David C. Kalmuk, Toronto (CA); Jon A Lind, Beaverton, OR (US); Hebert W. Pereyra, Toronto (CA); Xun Xue, Markham (CA)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/427,385

(22) Filed: Apr. 30, 2003

(65) Prior Publication Data

US 2004/0221294 A1 Nov. 4, 2004

(51) Int. Cl.
G06F 9/44 (2006.01)
(52) U.S. Cl. ...................... 719/317; 719/312
(58) Field of Classification Search ........ 719/310–313, 719/317; 718/100, 104; 711/147, 170, 173; 709/213–215
See application file for complete search history.

(56) References Cited

U.S. PATENT DOCUMENTS

| | | | | |
|---|---|---|---|---|
| 4,825,354 | A * | 4/1989 | Agrawal et al. ............... 707/10 |
| 4,984,272 | A * | 1/1991 | McIlroy et al. ............... 726/17 |
| 5,566,326 | A * | 10/1996 | Hirsch et al. .................. 703/26 |
| 5,572,711 | A * | 11/1996 | Hirsch et al. .................. 703/26 |
| 5,652,885 | A * | 7/1997 | Reed et al. ..................... 713/1 |
| 5,721,876 | A | 2/1998 | Yu |
| 6,044,475 | A * | 3/2000 | Chung et al. .................. 714/15 |
| 6,105,148 | A * | 8/2000 | Chung et al. .................. 714/16 |
| 6,170,045 | B1 | 1/2001 | Bobak |
| 6,192,389 | B1 | 2/2001 | Ault |
| 6,493,729 | B2 * | 12/2002 | Gusler et al. ............... 707/204 |
| 6,567,811 | B1 * | 5/2003 | Edwards et al. ............ 707/100 |
| 6,604,046 | B1 * | 8/2003 | Van Watermulen et al. .......................... 701/208 |
| 6,604,123 | B1 * | 8/2003 | Bruno et al. ................. 718/100 |
| 6,662,268 | B1 * | 12/2003 | McBrearty et al. ......... 711/114 |
| 6,718,372 | B1 * | 4/2004 | Bober ......................... 709/217 |
| 6,802,068 | B1 * | 10/2004 | Guruprasad ................. 719/319 |
| 6,832,236 | B1 * | 12/2004 | Hamilton et al. ........... 718/100 |
| 6,931,449 | B2 * | 8/2005 | Schmidt et al. ............. 709/228 |
| 6,976,258 | B1 * | 12/2005 | Goyal et al. ................. 718/104 |
| 2002/0199000 | A1 | 12/2002 | Banerjee |

OTHER PUBLICATIONS

Parenty "The Incorporation of Multi-Level IPC into UNIX", 1989 IEEE, pp. 94-99.*
Linux System Calls, http://studies.ac.upc.es/ETSETB/ARISO2/'Documentacion/ficheros_man.pdf, Jun. 3, 1999.
Unix—Modelo Computactional- IPC, GOTOBUTTONBM_1_, Oct. 30, 2002.

* cited by examiner

Primary Examiner—Van H. Nguyen
(74) Attorney, Agent, or Firm—Duke W. Yee; Justin M. Dillon; Peter B. Manzo

(57) ABSTRACT

An operating system directed to using special properties of a common inter-process communications mechanism (IPC), namely UNIX domain socket-pairs or stream-pipes alternatively as a storage medium for file-descriptors of UNIX processes. When a file-descriptor is written into a socket-pair, and closed in the UNIX process, the file remains open, but occupies no space in the process' file-table. The file-descriptor may later be read out of the socket-pair to reestablish it in the file-table, and access it. This property is implemented in an IPC mechanism of UNIX operating system whereby a process such as a dispatcher may manage more connections and processes than its file-table size allow. This provides scalability improvements of the UNIX operating system.

3 Claims, 6 Drawing Sheets

METHOD AND SYSTEM FOR OPTIMIZING FILE TABLE USAGE

TECHNICAL FIELD

The invention relates to operating systems, more particularly to an operating system having an inter-process communications (IPC) mechanism for facilitating communication of file-descriptors between executing processes.

BACKGROUND OF THE INVENTION

One widely used multi-user, multi-tasking operating system (OS) is the UNIX® or UNIX-like OS (UNIX is a trademark of The UNIX System Laboratories, Inc.). UNIX-like OSes include UNIX variations such as BSD UNIX developed at UC Berkeley, and FreeBSD™ (a trademark of The FreeBSD Foundation); XENIX® (a registered trademark of Microsoft Corporation); LINUX® (a registered trademark of Linus Torvalds) and its variations, for example GNU™ (trademark of the GNU Project); and AIX® (a registered trademark of IBM), among others. Common among these operating systems is an inter-process communication mechanism including stream pipes and sockets for communicating between processes.

Each process, in order to perform a specific assigned function, is enabled to open and close files in order to support execution of the process. A description of these files is stored in a fixed size file-table which maintains descriptors for each file opened by the process. Consequently, the fixed size of the file-table limits the number of files that a process may have open simultaneously. A limited number of opened files defined by a UNIX system directly affects the scalability of the UNIX system. This is a very important feature in systems such as a server system that are intended to support multiple client connections.

A typical server system comprising the UNIX operating system will often use a communication multiplexer for management of multiple client connections. The communication multiplexer services and manages client connections using a combination of a set of dispatcher processes and agent processes, where each dispatcher process dispatches requests from active client connections to agent processes. The agent processes are responsible for performing those requests that include communication with a client application. The use of a combination of dispatcher processes and agent processes maximizes the number of client connections that can be handled by reducing the number of processes required in the system. However, the scalability of such a server system (i.e. the number of client connections that can be handled simultaneously) is directly dependent upon the number of connections a dispatcher process can manage. Such a server system suffers from poor scalability on systems with a small maximum file-table size which is typically defined by the particular version of the installed UNIX OS. If the system is required to maintain any other files associated with a particular client connection, the impact of the small file-table size may be significant.

In a database system such as DB2® available from International Business Machines Corporation, client applications may require the server system to create and maintain socket connections from the agent processes on the server to an external source when implementing a data-links feature. Since agent processes only service a particular connection for a single request, the dispatcher processes are required to maintain the sockets in addition to the client connections while the connection is not being serviced by an agent process. As a simple example, in a system in which there are 10 sockets to maintain for every client connection in the system, the resulting degredation in the amount of client connections a dispatcher process could manage simultaneously would decrease by more than a factor of 10.

It is desirable, in server systems based on the UNIX OS, to optimize file-table usage in order to minimize the impact of limitations defined by a limited size of UNIX OS file-table. A solution that addresses some or all of these shortcomings is therefore desired.

SUMMARY OF THE INVENTION

The present invention is directed to common inter-process communication mechanisms adapted as a data storage medium for file-descriptors. Such mechanisms include stream pipes and socket pairs.

In accordance with an aspect of the invention, for a computer system having a operating system providing an inter-process communication (IPC) mechanism for communicating file-descriptors between processes executing on said computer system and providing a file table to each of said processes for maintaining a limited number of file-descriptors, there is provided a method for optimizing usage of a one of said file tables. The method comprises storing in said file table IPC file-descriptors for an instance of said IPC mechanism, said instance of said IPC mechanism storing a plurality of file-descriptors to be maintained by said file table.

In accordance with a feature of the invention, the method comprises receiving said IPC file-descriptors from a one of said processes via a shared instance of the IPC mechanism, said one of said processes storing said plurality of file-descriptors using said IPC file-descriptors. Optionally, the method may comprise sending said IPC file-descriptors to said one of said processes via a shared instance of the IPC mechanism, said one of said processes restoring said plurality of file-descriptors to an associated file table of said one of said processes. As such, the method may further comprise removing said IPC file-descriptors from said file table. The method may comprise returning said shared IPC mechanism to a pool of shared IPC mechanisms following said receiving. The method may comprise obtaining said shared IPC mechanism from a pool of shared IPC mechanisms prior to said sending.

In accordance with a feature of the method, the instance of said IPC mechanism is a non-shared instance of said IPC mechanism.

In accordance with a further feature, the method comprises partitioning the file table into a plurality of partitions, each partition maintaining a subset of the limited number of file-descriptors; reserving a partition as a reserved partition for storing a plurality of IPC file-descriptors, said IPC file-descriptors for a plurality of instances of the IPC mechanism wherein each of said instances of the IPC mechanism adapted to store said subset of the limited number of file-descriptors; and storing the file-descriptors of a selected one of said partitions to one of said plurality of instances of the IPC mechanism using associated IPC file-descriptors for said one the instance; and wherein the step of storing to said file table IPC file-descriptors stores said associated IPC file-descriptors to said reserved partition.

In accordance with this feature, may comprise storing to said selected one of said partitions the file-descriptors from another IPC mechanism selected from said reserved partition, said another IPC mechanism having stored file-descriptors for a one of said plurality or partitions. Further the method may comprise choosing the another IPC mechanism in response to a need to access a file descriptor stored by said another IPC mechanism. The selected partition may be chosen in response to a recent access to said selected partition.

In accordance with another aspect of the invention, for a computer system having a operating system providing an inter-process communications (IPC) mechanism for communicating file-descriptors between processes executing on said computer system and providing a file table to each of said processes for maintaining a limited number of file-descriptors, there is provided a computer program product embodied in a computer readable medium for instructing the computer system where the computer program product comprises code for optimizing usage of a one of said file tables. The computer program product comprises code for storing in said file table IPC file-descriptors for an instance of said IPC mechanism, said instance of said IPC mechanism storing a plurality of file-descriptors to be maintained by said file table.

In accordance with a yet another aspect, there is provided an extended scalability multiplexing system comprising: a dispatcher process adapted to multiplex a plurality of requests received from one or more connections for processing by one or more agent processes, said dispatcher process having a file table for maintaining file-descriptors; one or more said agent processes, said agent processes using file-descriptors in association with each of said connections for processing individual said requests and communicating said file-descriptors to said dispatcher process for maintaining; an inter-process communications IPC mechanism for communicating file-descriptors between processes, said IPC mechanism adapted for generating instances of said IPC mechanism, each instance being accessible by IPC file-descriptors and capable of storing a plurality of file-descriptors that remain open when so stored; said agent processes adapted to store file-descriptors for maintaining by said dispatcher process to instances of said IPC mechanism and to communicate said instances to said dispatcher process; and said dispatcher process adapted to store to said file table IPC file-descriptors associated with said instances received from said agent processes.

In accordance with a feature, the system comprises a pool of a plurality of selectable instances of said IPC mechanism, said instances shared by said dispatcher and agent processes for inter-process communications; and wherein the dispatcher and agent processes are adapted to communicate file-descriptors for maintaining by said dispatcher process using said pool.

The dispatcher process may be adapted to send to a one of said agent processes a request received from a particular one of said connections and an instance of the IPC mechanism stored to the file table, said IPC mechanism storing file-descriptors for processing requests from the particular one of said connections.

In accordance with an yet another aspect of the invention, there is provided, for a data processing system having an operating system providing an inter-process communications (IPC) mechanism adapted for passing file descriptors between processes and providing file tables for the processes, a method for manipulating a file descriptor stored in a file table entry of a file table including transferring the file descriptor from the file table entry to the IPC mechanism, thereby preserving the file descriptor in the IPC mechanism while permitting availability of the unloaded file table entry for other uses; and, transferring the file descriptor from the IPC mechanism to an available file table entry if access to the file descriptor is requested.

In accordance with an yet another aspect of the invention, there is provided a data processing system having an operating system providing an inter-process communications (IPC) mechanism adapted for passing file descriptors between processes and providing file tables for the processes, the data processing system for manipulating a file descriptor stored in a file table entry of a file table, including means for transferring the file descriptor from the file table entry to the IPC mechanism, thereby preserving the file descriptor in the IPC mechanism while permitting availability of the unloaded file table entry for other uses; and, means for transferring the file descriptor from the IPC mechanism to an available file table entry if access to the file descriptor is requested.

In accordance with an yet another aspect of the invention, there is provided a computer program product having a computer readable medium tangibly embodying computer executable code for directing a data processing system having an operating system providing an inter-process communications (IPC) mechanism adapted for passing file descriptors between processes and providing file tables for the processes, the data processing system for manipulating a file descriptor stored in a file table entry of a file table, the computer program product including code for transferring the file descriptor from the file table entry to the IPC mechanism, thereby preserving the file descriptor in the IPC mechanism while permitting availability of the unloaded file table entry for other uses; and, code for transferring the file descriptor from the IPC mechanism to an available file table entry if access to the file descriptor is requested.

BRIEF DESCRIPTION OF THE DRAWINGS

Further features and advantages of the embodiment of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The following detailed description of the embodiments of the present invention does not limit the implementation of the invention to any particular computer programming language. The present invention may be implemented in any computer programming language provided that the OS (Operating System) provides the facilities that can support the requirements of the present invention. A preferred embodiment is implemented in the C or C++ computer programming language (or other computer programming languages in conjunction with C/C++). Any limitations presented would be a result of a particular type of operating system, computer programming language or data processing system, and would not be a limitation imposed by the the embodiment(s) of the present invention.

Figure 1:
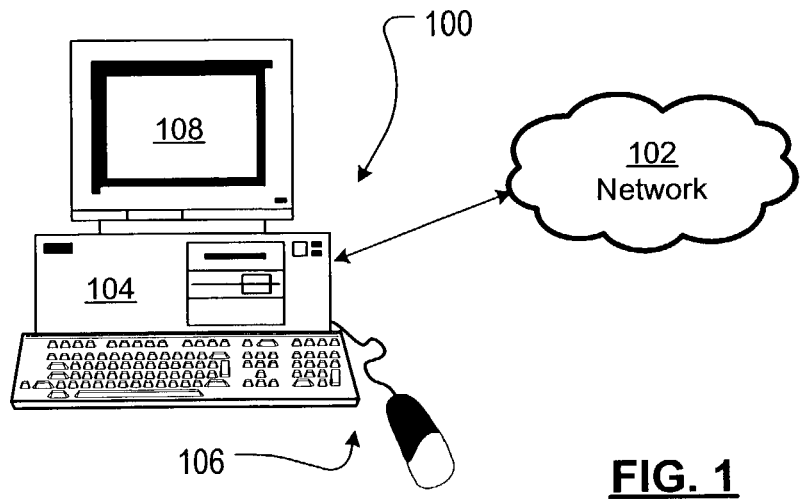
FIG. 1 schematically illustrates a computer system embodying aspects of the invention.

An embodiment of the present invention, computer system 100, is illustrated in FIG. 1. Computer system 100, which is illustrated for exemplary purposes as a computing device, is adapted to communicate with other computing devices (not shown) using network 102. As will be appreciated by those of ordinary skill in the art, network 102 may be embodied using conventional networking technologies and may include one or more of the following: local networks, wide area networks, intranets, the Internet, and the like.

Throughout the description herein, an embodiment of the present invention is illustrated with aspects of the invention embodied solely on computer system 100. As will be appreciated by those of ordinary skill in the art, aspects of the invention may be distributed amongst one or more networked computing devices which interact with computer system 100 using one or more networks such as, for example, network 102. However, for ease of understanding, aspects of the invention have been embodied in a single computing device—computer system 100.

Computing device 100 typically includes a processing system 104 which is enabled to communicate with the network 102, and various input devices 106 and output devices 108. Input devices 106, (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 104. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
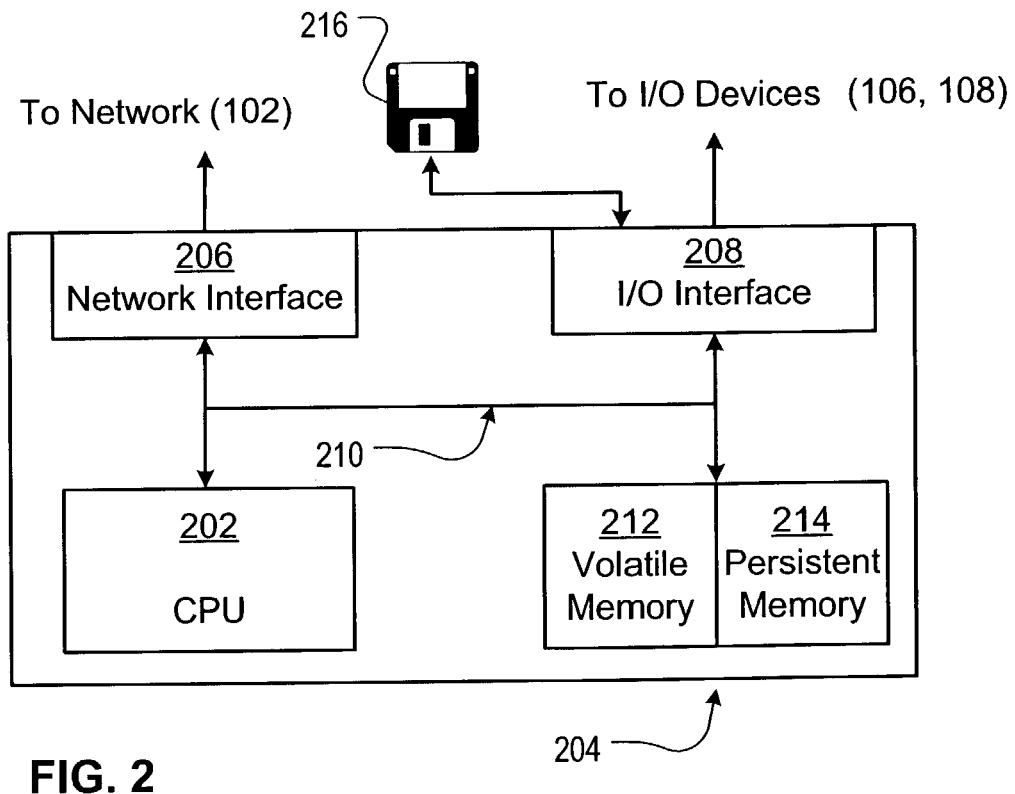
FIG. 2 schematically illustrates in greater detail, a portion of the computer system of FIG. 1.

Exemplary processing system 104 is illustrated in greater detail in FIG. 2. As illustrated, processing system 104 includes a number of components: a central processing unit (CPU) 202, memory 204, network interface (I/F) 206 and input-output interface (I/O I/F) 208. Communication between various components of the processing system 104 may be facilitated via a suitable communications bus 210, as required.

CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of processing system 104 could use alternative CPUs and may include embodiments in which one or more CPUs are employed (not shown). CPU 202 may include various support circuits to enable communication between itself and the other components of processing system 104.

Memory 204 includes both volatile memory 212 and persistent memory 214 for the storage of: operational instructions for execution by CPU 202, data registers, application and thread storage, and the like. Memory 204 preferably includes a combination of random access memory (RAM), read only memory (ROM) and persistent memory such as that provided by a hard disk drive.

Network I/F 206 enables communication between other computing devices (not shown) and other network computing devices, via network 102. Network I/F 206 may be embodied in one or more conventional communication devices. Examples of a conventional communication device include: an Ethernet card, a token ring card, a modem, or the like. Network I/F 206 may also enable the retrieval or transmission of instructions for execution by CPU 202, from or to a remote storage media or device, via network 102.

I/O I/F 208 enables communication between processing system 104 and the various I/O devices 106 and 108. I/O I/F 208 may include, for example a video card for interfacing with an external display such as output device 108. Additionally, I/O I/F 208 may enable communication between processing system 104 and a removable media 216. Removable media 216 may comprise a conventional diskette or other removable memory devices such as Zip™ drives, flash cards, CD-ROMs, static memory devices, and the like. Removable media 216 may be used to provide instructions for execution by CPU 202 or as a removable data storage device.

Figure 3:
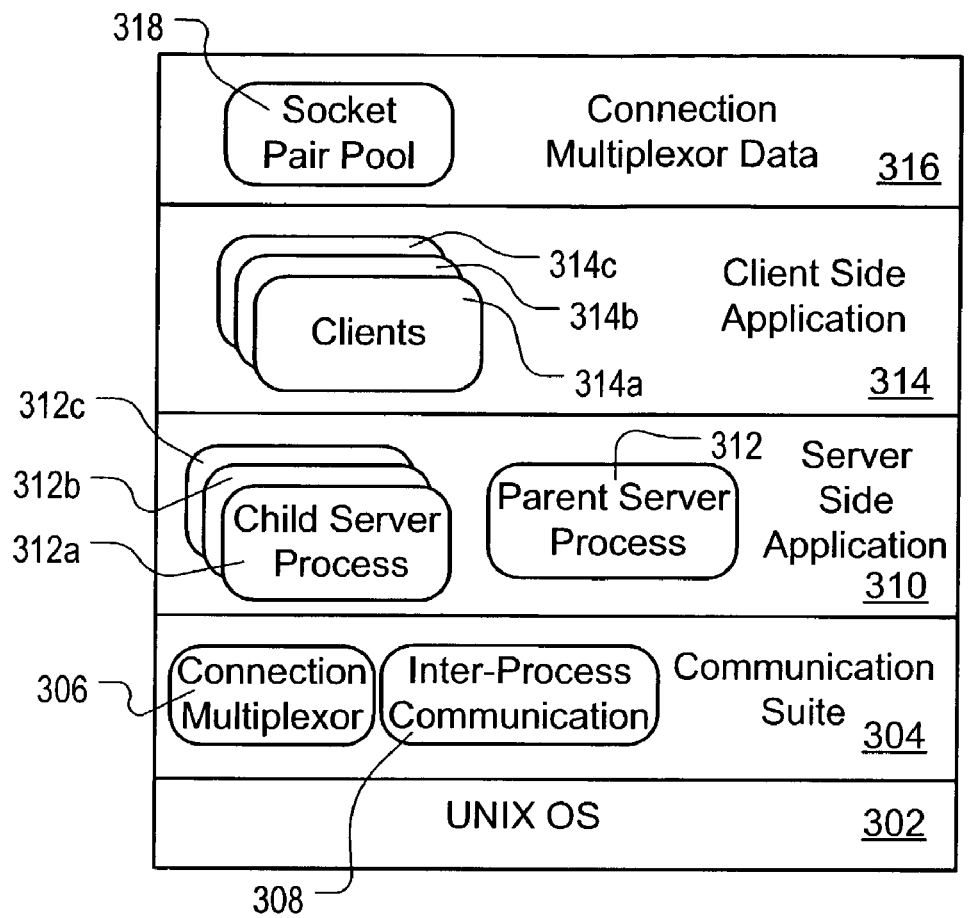
FIG. 3 illustrates in functional block form, a portion of the memory illustrated in FIG. 2.

The computer instructions/applications stored in memory 204 and executed by CPU 202 thereby adapting the operation of computer system 100 as described herein) are illustrated in functional block form in FIG. 3. As will be appreciated by those of ordinary skill in the art, the discrimination between aspects of the applications illustrated as functional blocks in FIG. 3 is somewhat arbitrary, in that the various operations attributed to a particular application as described herein may, in an alternative embodiment, be subsumed by another application.

As illustrated for exemplary purposes only, memory 204 stores a number of applications and data for enabling the operation of the system in order to optimize file table usage on a UNIX operating system including: an operating system (OS) 302 which includes a connection multiplexor module 306 and an inter-process communication (IPC) mechanism 308; a communication suite 304; a server side application 310 that comprises at least one parent server process 312 which is enabled to open a plurality of child process: three child processes are illustrated (312*a*, 312*b*, 312*c*); a client application 314 comprising at least one client process: three client processes are illustrated (314*a*, 314*b*, 314*c*); and connection multiplexor data 316 comprising a socket pair pool (SPP) 318. The operating system may be the UNIX® or a UNIX-like operating system having inter-process communication mechanisms. The operating system may make use of socket pairs or stream pipes as storage for file-descriptors.

UNIX OS 302 is an operating system suitable for operation with a selected CPU 202 and the operations described herein. Communication suite 304 provides, through interaction with UNIX OS 302 and network I/F 206 (FIG. 2), suitable communication protocols to enable communication with other networked computing devices via network 102 (FIG. 1). Communication suite 304 may include one or more of such protocols, such as TCP/IP, Ethernet, token ring and the like. Communications suite 304 preferably includes asynchronous transport communication capabilities for communicating with other computing devices.

The server side application 310 which is enabled to be executed in an environment provided by UNIX OS 302, services requests from the client side application 314. In the illustrated example, the client side application 314 is executed on the same computer system 100 (FIG. 1), but it must be understood that the client side application 314 can be executed on a remote computer system enabled to communicate with the server side application via network 102.

The client side application 314 may include a plurality of different client processes 314a, 314b and 314c each of which is enabled to interact with the server side application 310 via communication suite 304, using the communication multiplexor 306 adapted in accordance with the invention from the standard feature of UNIX's IPC mechanism. In order to exchange information between processes involved in serving requests from the client side application 314, socket pairs or stream pipes are used (not shown). The UNIX OS 302 incorporates aspects of the embodiment of the present invention in the exemplary embodiment using the socket pair pool 318 for maintaining a plurality of socket pairs or stream pipes, providing scalability of UNIX OS 302 for servicing requests from the clients 314a, 314b and 314c of client side application 314. The use of socket pairs or stream pipes in the socket pair pool 318 facilitates scalability otherwise limited by the size of the file-table, as described further herein below.

Figure 4:
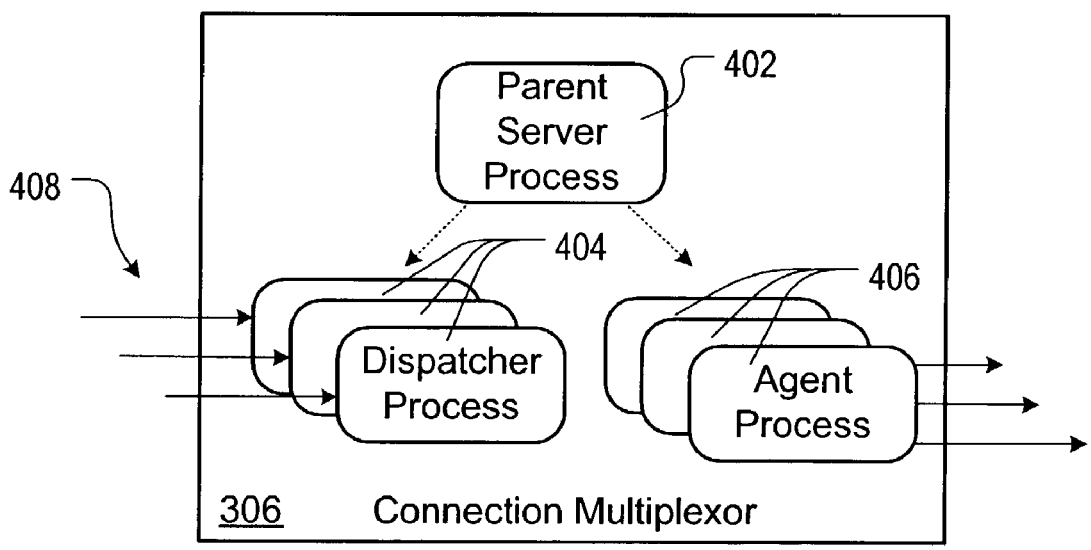
FIG. 4. schematically illustrates a connection multiplexor of the communication suite illustrated in FIG. 3.

FIG. 4 schematically illustrates a connection multiplexor 306. The connection multiplexer 306 comprises a parent process 402 which is initially loaded by the server side application 310. The parent process 402 is responsible for setting up the execution environment for the connection multiplexor 306. The parent process 402 provides forking of the two main classes of processes involved in a multiplexor architecture, e.g. dispatcher processes 404 and agent processes 406. Each of the dispatcher processes 404 is responsible for monitoring a predetermined number of client connections 408, each of which is used to provide a connection between respective client 314a, 314b and 314c of client side application 314 and the server side application 310. The number of connection served by each dispatcher process is defined by the size of its file-table.

The client connections 408 are communication channels established by each client application 314 on the same system, as is illustrated herein, or on different computer systems (not shown). The client connections 408 can be coupled to the communications multiplexor 306 using communication suite 304 via the network 102, using a well-known communications protocol such as TCP/IP, etc.

The communication multiplexor 306, using connections 408, facilitates communication of the server side application 310 and the client application 314. The client side application 314 can issue a request for processing by server side application 310. When dispatcher 404 detects activity on any of the client connections 408, it sends that connection to an agent process 406 for servicing. Dispatchers 404 are able to monitor multiple client connections 408 simultaneously, thereby achieving the multiplexing effect.

Agent processes 406, on receipt of an active connection from the dispatcher process 404, become responsible for serving one of the client connections 408. The agent process 406, reads the request received via the client connection 408, facilitates delivery of the task requested by the client application 314 to the server side application 310, and, if applicable, sends a response back to the client application 314. After a series of requests has been performed, the agent process 406 passes the client connection 408 back to the respective dispatcher 404 for further monitoring. An agent process 406 may process a request from the same or another dispatcher 404, and continue repeating serving connections for the duration of its lifetime. It should be noted that an agent process 406 is enabled to serve a single connection at a time. In order to support multiplexing of client connections 408 and to facilitate processing of requests from the client side applications 314 by the server side applications 310, the UNIX OS uses socket-pairs.

A UNIX socket-pair is an inter process communication (IPC) mechanism implemented in all the major UNIX variants, that allows socket based communication between two processes, e.g. processes of server side application 310, and client side application 314. A process uses a socket-pair( ) application program interface (not shown) which creates a pre-connected pair of sockets, accessed via two file-descriptors opened in the process' file table. The process then forks a child process which inherits both descriptors from the socket-pair, and each process closes an end of the socket-pair, respectively.

The two processes through their open descriptors, can communicate with each other in full-duplex communication mode. Processes can also exchange file-descriptors which will be opened as new entries in the receiving process' file-table. The file-descriptor exchange facilitates opening a child process file-table file as a new entry when the child process reads the file-descriptors from the socket-pair.

File-descriptors are stored in a UNIX file table which is stored in the kernel of UNIX OS 302, for mapping unsigned integers to open file resources in the UNIX OS 302. In a UNIX multi-process OS 302, each process has its own private file table. All valid descriptors of each private file-table are stored in a global system-wide file-table within the kernel, for indexing resources of UNIX OS.

Valid file-descriptors in a process' file table may be transferred to another process, either by inheriting copies of any open descriptors of a process' file table, or by passing the descriptors to another process through a domain-socket pair that is shared by both processes (implying that it is inherited from a mutual parent process which opened the original socket-pair). The latter method allows the receiving process to map some of the descriptors in its own file table, to the same shared file resource. In this manner, multiple processes can share access to a common file-type resource, or transfer such a resource between processes, the rule of thumb being, that at least one process must maintain a reference to that resource in its table in order to keep it active in the system.

In accordance with the invention, storage medium properties of UNIX IPC's mechanisms, namely UNIX domain socket pairs and or stream-pipes are exploited as storage for file descriptions rather than just as a communications mechanism as is commonly known. Both stream-pipes and socket pairs have the property that they allow file-descriptors to be passed between processes in the system. This is a well known property of such IPC mechanisms.

A file may be passed from one process to another as follows. A stream-pipe is created in a process and the process forks a child process. The child process inherits access to the stream-pipe automatically via the fork operation. The parent process subsequently opens a file, writes the file descriptor for that file into the stream-pipe via a system call, and then closes the file. The child process may then read the file-descriptor from the stream-pipe via a system call, and access to the file will be established in the child process.

In this way the file is passed from the parent process to the child process (the file could have alternately been opened in the child process and subsequently passed to the parent process).

One key property of the stream-pipe mechanism is that even though there was a period when the file was not opened in any process, since the file-descriptor was in the stream pipe, the file is kept open by the operating system (normally if the file is not open in any process, the operating system will automatically close the file. In the case where the file is a connected socket, the process would lose the connection). This invention makes use of this unique property of socket pairs and stream-pipes as a method to store file-descriptors rather than using the process just as a communications medium. When a file-descriptor is written into a socket pair and closed in a process, the file remains open, but occupies no space in the process' file-table. The file-descriptor may later be read out of the socket pair to reestablish it in the file-table, and access it. By making use of this property, a mechanism may be implemented whereby a process may manage far more files than its file-table size would normally allow. This provides scalability improvements in our preferred embodiment.

Specifically, in the preferred embodiment the invention facilitates a reduction of the cost of storing the file-table state (that is preserving a set of descriptors from one process' file-table to later be restored in that process or another process' file-table) in a dispatcher or other process in a UNIX multi-process multiplexor architecture to a constant cost of 2 file-descriptors per application rather than a variable cost corresponding to the number of file-descriptors being preserved. This allows the maintenance of a scalable multiplexor architecture even if the maintenance as a file-table state associated with a client application is required.

FIGS. 5A-5D schematically illustrate a structure of data used for optimizing file table usage in UNIX OS 302.

Figure 5A:
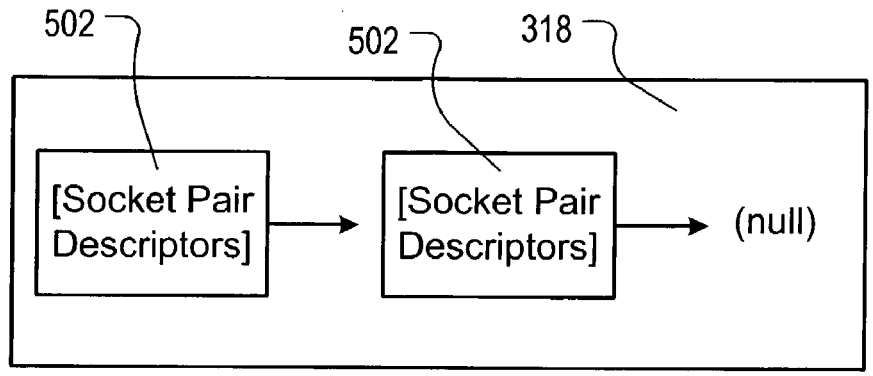
FIGS. 5A-5D schematically illustrate a structure of data used for optimizing file table usage in the UNIX OS illustrated in FIG. 3.

FIG. 5A schematically illustrates SSP 318 comprising a linked list stored in the memory 204 which is shared by all processes of the connection multiplexor 306, e.g. parent process 402, dispatcher processes 404, and agent processes 406. SSP 318, which is anchored at a predetermined address of memory 204, is synchronized via UNIX OS synchronization mechanisms to provide concurrent access of multiple processes. Each node representing a socket-pair 502 (only two nodes are illustrated) in SSP 318 contains two integers corresponding to the ends of a UNIX domain socket-pair. SSP 318 is used to maintain a list of shared socket-pairs in the system. A process needing to allocate a shared socket-pair will remove a node from SSP 318 and make use of the socket-pair descriptors from that node. When the use of the socket-pair is complete, it will be re-inserted into SSP 318, thereby permitting re-use. A process which attempts to obtain a node from SSP 318 when the list is empty must be blocked until an available node is present in the list.

Figure 5B:
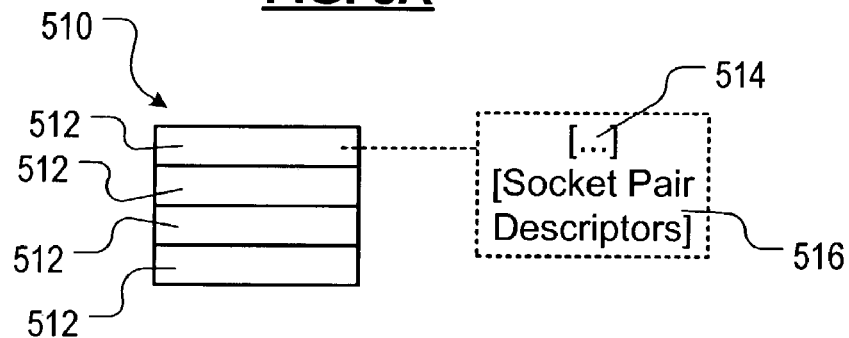

FIG. 5B Schematically illustrates a connection array 510 which is maintained by each dispatcher process 404 in order to store information on each connection 408 monitored by the dispatcher process 404. The connection array 510 comprises a fixed number (e.g. 500) of connection entries 512. Each connection entry 512 contains a file descriptor 514 corresponding to the client connection 408, and two file-descriptors 516 corresponding to the socket-pair denoted as the 'transport pair', which is used to store file-table state on behalf of an agent process 406.

Figure 5C:
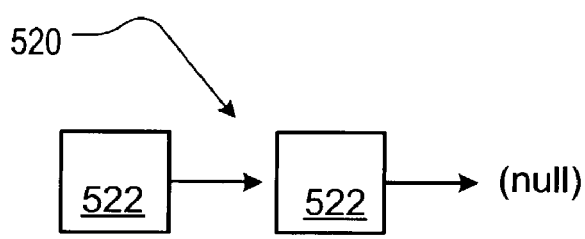

FIG. 5C schematically illustrates an agent-ready queue 520 of connections waiting to be serviced by agent processes 406 (only two connections 522 are illustrated for exemplary purposes). The agent-ready queue 520 is implemented using UNIX OS mechanisms such as a 'message-queue', or any other type of IPC mechanisms that support queuing.

Figure 5D:
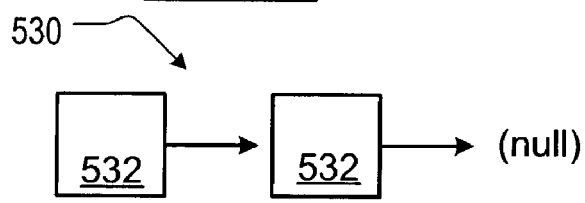

FIG. 5D schematically illustrates a dispatcher ready queue 530 of connections waiting to be serviced by a dispatcher process 404 (only two connections 532 are illustrated for exemplary purposes). The dispatcher-ready queue 530 is implemented using UNIX OS mechanisms such as a 'message-queue', or any other type of IPC mechanisms that support queuing.

Figure 6:
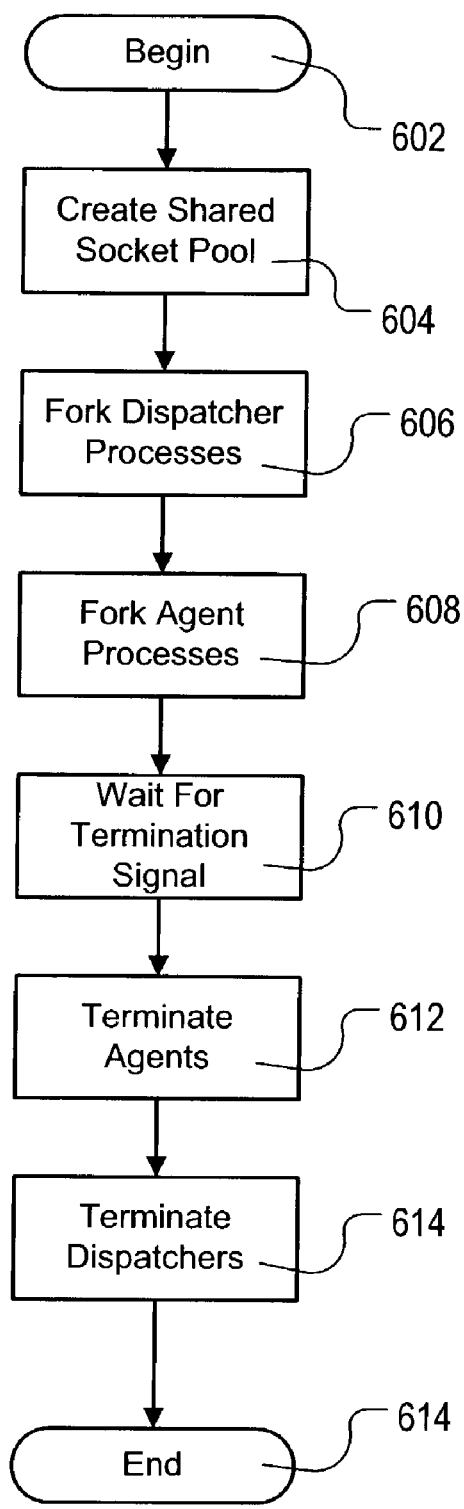
FIG. 6 illustrates a flow chart of main steps involved in the operations of the parent process illustrated in FIG. 3.

FIG. 6 illustrates a flow chart 600 of operations of the parent process 402. The parent process 402 is launched (Step 602) as an executable program enabled to perform processes for initiating use of SSP 318 and for removing data, for opening applications, and shutting down operations of the connection multiplexor 306 on receipt of a termination signal.

On receipt of an initiation signal (Step 604) which can be issued by the server side application 310 or a user (not shown) to start use of the SSP 318, the parent process 402 allocates a shared region memory in the memory 204 and creates SSP 318 having the data structure described in FIG. 5A. The size of SSP 318 is defined by a size SSP parameter specified by the user and passed to the server side application 310 which launched the parent server process. To create SSP 318, the parent process 402 allocates one linked list node, and creates one UNIX domain socket-pair for each entry in the linked list iteratively. Each socket pair's descriptors will be saved in a linked list node, which will then be inserted into the linked list.

As is well known, in the UNIX OS 302, any processes which are forked by the parent process 402 will inherit access to SSP 318 since it is present in the shared region memory, and will also inherit access to the socket pair descriptors which can be shared by all processes (e.g. dispatcher processes 404 and agent processes 406) and forked from the parent process 402.

The dispatcher processes 404 in the connection multiplexor 306 are then forked (Step 606). The ratio of dispatcher processes 404 to fork is determined by a forking parameter which is sent into the parent process 402 by the server side application 310. Each dispatcher process 404 will inherit access to SSP 318, (Step 604). After the dispatcher processes 404 have been forked, the parent process 402 forks the agent processes 406, (Step 608). The number of agent processes 406 to fork will be determined by an agent processes parameter passed into the parent process 402 by the server side application 310. Each agent process 406 consequently inherits access to SSP 318 as described in step 604.

At Step 610, the parent process 402 waits for an external termination signal, such as a specific UNIX OS signal—SIGUSR1. Execution of the parent process 402 will be halted when the parent process 402 receives the termination signal. Until the termination signal is received, the connection multiplexor 306 multiplexes the client connections 408.

On receipt of a termination signal, the parent process 402 generates and sends an agent termination signal to each agent process 406 (Step 612) in order to close all agent processes 406, and then generates and sends a dispatcher termination signal to each dispatcher process 404 (Step 614) in order to close all dispatchers 404. When all dispatcher processes 404 and agent processes 406 are closed, the processing of the client connection 408 is stopped (Step 616).

Figure 7:
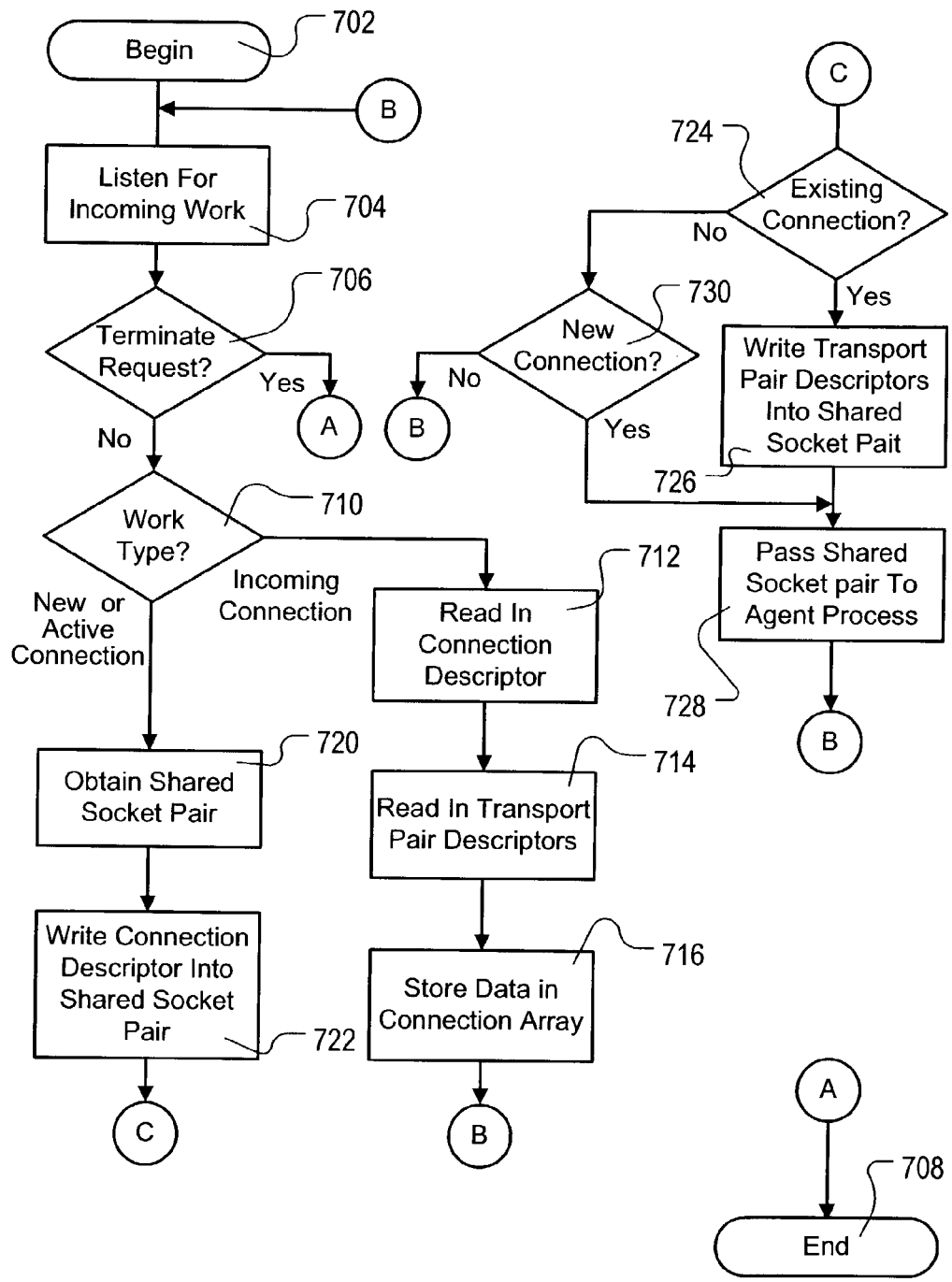
FIG. 7 illustrates a flow chart of the main steps involved in operations of the of the dispatcher process illustrated in FIG. 3.

FIG. 7 illustrates a flow chart 700 of operations of the dispatcher process 404. A dispatcher process 404 which is forked (Step 702) by the parent process 402 is responsible for monitoring of a set of client connections 408. Each active client connection will be passed to an agent process 406 for servicing.

In the preferred embodiment of the invention the dispatcher process 404 is also responsible for maintaining an agent file-table state associated with each monitored client connection 408.

When the dispatcher processes 404 are forked, each of dispatcher processes 404 start to listen to a set of client connections 408 for their activity (Step 704). Each monitored client connection 408 is specified in the client connection array 510, and the dispatcher ready queue 530 using a UNIX OS operation "select( )". Alternate methods will be familiar to those skilled in the art and may also be used.

On detecting activity which can be a request from the client side application 314, the dispatcher process 404 classifies a type of the received request.

If a termination request is received (Step 706), the dispatcher process 404 will terminate (step 708). Step 710 involves a decision depending on the type of work detected via the select( ). If the request in the dispatcher ready queue 530 has activity on it, execution proceeds to step 712. The dispatcher process 404 de-queues the next entry in the dispatcher ready list 530, reads the connection descriptor 514 (step 712), and then reads the two 'transport pair' descriptors 516 (step 714), from the shared socket pair in that entry. Subsequently the descriptors read in, will be stored in an available connection entry 512 in the connection array 510 for that dispatcher (step 716). At this stage the dispatcher process 404 owns the transport pair descriptors which contain any packed up file table state created by the agent process during execution. The dispatcher process 404 then continues listening to client connections 408 for their activity (Step 704).

Otherwise, at step 710, if a client connection that the dispatcher process 404 is monitoring has become active, or a new client connection has been established with the dispatcher 404, operations proceed to step 720. The dispatcher process 404 obtains a shared socket pair (Step 720) from the SSP 318. This will be done by the dispatcher process 404 using the SSP linked list 510 for synchronizing the SSP list 510 with other dispatcher processes. If at the moment of obtaining shared socket pair, the SSP list does not have an available shared socket pair, the dispatcher will be waiting until a node becomes available in the SSP list 510, and will then remove that node from the SSP list 510. Once the shared socket pair has been obtained, the dispatcher process 404 will write the descriptor for the detected active connection 408 into the shared socket-pair. Then, the descriptors maintained in the shared socket-pair, and the dispatcher process 404 closes the file-descriptor of the active connection in its file-table.

If the active connection is identified (Step 724) as an existing connection which is file-table state preserved on behalf of an agent process 406 and the transport pair descriptors can be found in the connection entry 510, the transport pair descriptors will be written into the obtained shared socket pair (Step 726). The transport pair descriptors are subsequently closed in the dispatcher process 404. Then, the shared socket pair is passed to an agent process (Step 728).

If the active connection is identified (Step 724) as a new connection which is not file-table state preserved on behalf of an agent process, the shared socket pair is passed to an agent process (Step 728).

Figure 8:
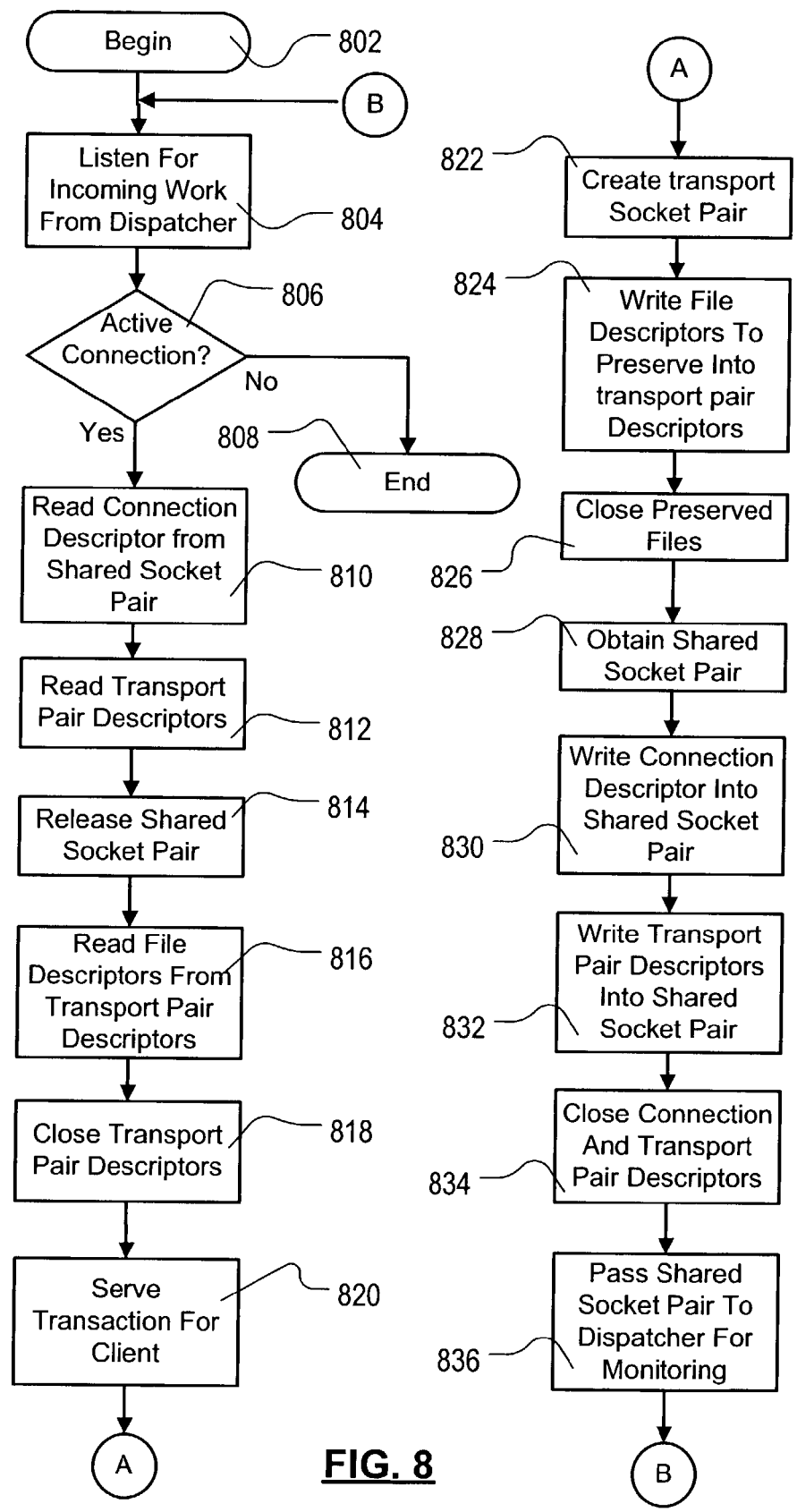
FIG. 8 illustrates a flow chart of the main steps involved in operations of an agent process illustrated in FIG. 3.

FIG. 8 illustrates a flow chart 800 of operations of the agent process 404. The agent process 406 is responsible for serving requests of active connections received from a dispatcher process 404, and on completion, serving requests to return the active connection to a dispatcher process 404 for further monitoring. Between iterations of processing a particular connection, any of the file-table state required by that connection in the agent process 406 is preserved.

After an agent process 406 is forked (Step 802) by the parent process 402 and is listening on the agent ready queue 520, agent process 406 listens for incoming work from a dispatcher process 404 (Step 804). Once a request has been detected, the information associated with the selected agent process 406 is removed from the agent queue list 520, and the agent process 406 then begins to process the request by identifying (Step 806) whether the received request has been received from an active connection or whether the request is a termination signal. If the request is a termination signal, the agent process 406 is halted (Step 808). If the request is received from an active connection (or on the ready queue), the agent process 406 reads and stores the connection descriptor from the SSP node 510 received from the agent ready queue 520 (Step 810). The agent process 406 then reads and stores the transport pair descriptors from the SSP 318 (Step 812) if they are present. The shared socket pair is subsequently returned to the SSP 318 by inserting the node into the shared socket pair list 510 (Step 814).

Step 816, the preserved file-descriptors are read from the transport pair descriptors and then the transport pair descriptors are closed in the agent process 406 (Step 818) in order to discard the transport pair. At this point, the file table state stored in the transport pair has been restored in the agent process' file table. When the file table state is restored in the agent process' file table, the agent process 404 is able to serve the request from the client connection 408 (Step 820). That includes reading requests from the client connection 408 and performing appropriate action on the server side application 310 in response to the request. A response will subsequently be issued and sent back over to the client connection 408.

The agent process 406 will continue to serve client requests until a transaction has been completed. At this point a new UNIX domain socket-pair (denoted as the 'transport socket-pair') is created (Step 822), and then (Step 824) file-descriptors stored in the agent's file-table that are needed to be preserved are written into the transport socket-pair. The agent process 406 will subsequently close all those file-descriptors locally in order to free up file table space for the next request (Step 826). The file-descriptors will remain open while in the transport socket-pair. At step 828, the agent process 404 obtains a shared socket-pair node from the shared socket-pair list 510, if SSP 318 has an available shared socket-pair node, or wait until a shared socket-pair node will be returned to SSP 318.

The connection descriptor will then be written into the shared socket pair (Step 830), and both transport pair descriptors will be written into the shared socket pair (Step 832). Finally, both the connection descriptor, and the transport pair descriptors will be closed in the agent process 406 (Step 834). At next step 836, the shared socket-pair node 512 is enqueued in the dispatcher ready list 530 and the agent process 406 listens for incoming work from dispatcher process 404. The agent process 406 performs sequential steps from step 804 to step 836, until a termination signal is received.

The use of shared socket pairs or stream pipes stored in the SSP 318 along with the use of 'transport' socket pairs facilitates enhancing the scalability of UNIX IPC mechanism 308.

An alternate implementation for this invention would be to implement a file-table caching scheme, allowing the simulation of a file-table size in a process that is actually larger than the process' actual file-table size. To accomplish this, the file-table is partitioned into fixed sized pieces, and a small set of file-descriptors in the table would be reserved for storing stream-pipes used to maintain the file-table state. The process would initially create a set of stream-pipes to be used for storing file-descriptors. It is important that more stream-pipes would be created than partitions in the file-table. Each stream-pipe is allocated a buffer size large enough to accommodate storing the file-descriptors for an entire partition from the file-table.

As an example, consider a file-table of size 1000. Partitions of 100 file-descriptors may be defined, with one partition reserved for stream-pipes (this would allow 50 stream-pipes). In these stream-pipes are stored 50 partitions of 100 file-descriptors each (i.e. 5000 file-descriptors total), while the file-table is only able to materialize 9 partitions (900 file-descriptors) at a time. One stream-pipe is set aside as a swap space and the other 49 are used as storage for file-descriptors. A system could maintain nearly 5000 'virtual files' in a single process.

A caching system could then be implemented whereby each time a virtual file is accessed, a determination is made as to whether the file currently resides in a partition in the file table, or one stored within a stream-pipe. If the file resides in a partition in the file-table, the actual file-descriptor may be looked up and used to perform an operation on the file. If the file resides in a partition stored in a stream-pipe, the least recently accessed partition in the file-table may be selected and written into the swap stream-pipe, closing all the file-descriptors in that partition. Then the partition containing the file is read out from its stream-pipe and into the file-table. The stream-pipe from which the partition is read becomes the new swap stream pipe. Since the file to be accessed is then in the file-table, the actual file-descriptor in the file-table is looked up and the desired operation on the file is performed.

By this method a file-table size of 4900 (49 storage stream-pipes) may be simulated in a process with a file-table size of only 1000. The property of locality in file workloads would ensure that in most cases the file we would access would already be materialized in the file-table, hence the cost of swapping partitions in and out of the table would be amortized across many file accesses in general, minimizing the performance impact of this approach.

The embodiment(s) of the invention described above is(are) intended to be exemplary only. The scope of the invention is therefore intended to be limited solely by the scope of the appended claims.

The embodiments of the invention in which an exclusive property or privilege is claimed are defined as follows:

1. A method for optimizing file table usage comprising:
storing file descriptors which reference a first socket pair within a file table associated with a dispatcher process to reduce a number of file descriptors simultaneously stored within said file table associated with said dispatcher process, wherein said first socket pair stores a plurality of file descriptors associated with an agent process, and each of said plurality of file descriptors references a corresponding closed file within a context of said agent process,
transferring said file descriptors which reference said first socket pair to said agent process via an inter-process communication (IPC) mechanism,
receiving said file descriptors which reference first socket pair from said agent process via the IPC mechanism, wherein said IPC mechanism comprises a second socket pair, wherein said second socket pair comprises a shared socket pair, and
obtaining said shared socket pair from a pool of shared socket pairs prior to a transfer of said file descriptors which reference said first socket pair to said agent process.

2. The method of claim 1 comprising returning said shared socket pair to said pool of shared socket pairs following a receipt of said file descriptors which reference said first socket pair from said agent process.

3. The method of claim 1 comprising:
partitioning the file table associated with said dispatcher process into a plurality of partitions, each partition maintaining a subset of file descriptors;
reserving a partition as a reserved partition to store a plurality of socket pair file descriptors, each corresponding to one of a plurality of socket pairs wherein each of said socket pairs is adapted to store said subset of file descriptors; and
storing file descriptors of a selected one of said plurality of partitions to one of said plurality of socket pairs using an associated one of said socket pair file descriptors; wherein storing said file descriptors of said selected one of said plurality of partitions to one of said plurality of socket pairs stores said associated socket pair file descriptors to said reserved partition.

* * * * *